United States Patent
Tokita

(10) Patent No.: US 10,057,449 B2
(45) Date of Patent: Aug. 21, 2018

(54) DOCUMENT ANALYSIS SYSTEM, IMAGE FORMING APPARATUS, AND ANALYSIS SERVER

(71) Applicant: CANON KABUSHIKI KAISHA, Tokyo (JP)

(72) Inventor: Ken Tokita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 69 days.

(21) Appl. No.: 15/130,027

(22) Filed: Apr. 15, 2016

(65) Prior Publication Data

US 2016/0321500 A1 Nov. 3, 2016

(30) Foreign Application Priority Data

May 1, 2015 (JP) ................. 2015-094293

(51) Int. Cl.
| | |
|---|---|
| *G06F 9/00* | (2006.01) |
| *H04N 1/04* | (2006.01) |
| *H04N 1/00* | (2006.01) |
| *G06F 17/30* | (2006.01) |
| *G06K 9/00* | (2006.01) |
| *G06K 9/62* | (2006.01) |

(52) U.S. Cl.
CPC ......... *H04N 1/04* (2013.01); *G06F 17/30011* (2013.01); *G06K 9/00442* (2013.01); *G06K 9/6212* (2013.01); *H04N 1/00244* (2013.01); *H04N 1/00344* (2013.01); *H04N 2201/0094* (2013.01)

(58) Field of Classification Search
CPC .. H04N 1/04; H04N 1/00244; H04N 1/00344; G06F 17/30011; G06K 9/00442; G06K 9/6212
See application file for complete search history.

(56) References Cited

U.S. PATENT DOCUMENTS

| | | | |
|---|---|---|---|
| 2011/0055209 A1* | 3/2011 | Novac ................... | G06F 17/211 707/737 |
| 2015/0269135 A1* | 9/2015 | Kim ..................... | G06F 17/2276 704/8 |
| 2015/0331847 A1* | 11/2015 | Jung ..................... | G06F 17/277 707/739 |

FOREIGN PATENT DOCUMENTS

| | | | |
|---|---|---|---|
| JP | 2008-234078 A | | 10/2008 |
| JP | 2008234078 A | * | 10/2008 |

* cited by examiner

*Primary Examiner* — Sean Motsinger
(74) *Attorney, Agent, or Firm* — Fitzpatrick, Cella, Harper & Scinto

(57) ABSTRACT

Provided is a document analysis system including an image processing apparatus and an analysis server. The image processing apparatus is configured to extract text data from image data obtained by scanning a document, and sequentially send divided pieces of the extracted text data to the analysis server until a candidate storage location for the image data is received from the analysis server. The analysis server is configured to perform analysis based on the sent divided pieces of the text data, and return the candidate storage location to the image processing apparatus upon determination of the candidate storage location.

9 Claims, 14 Drawing Sheets

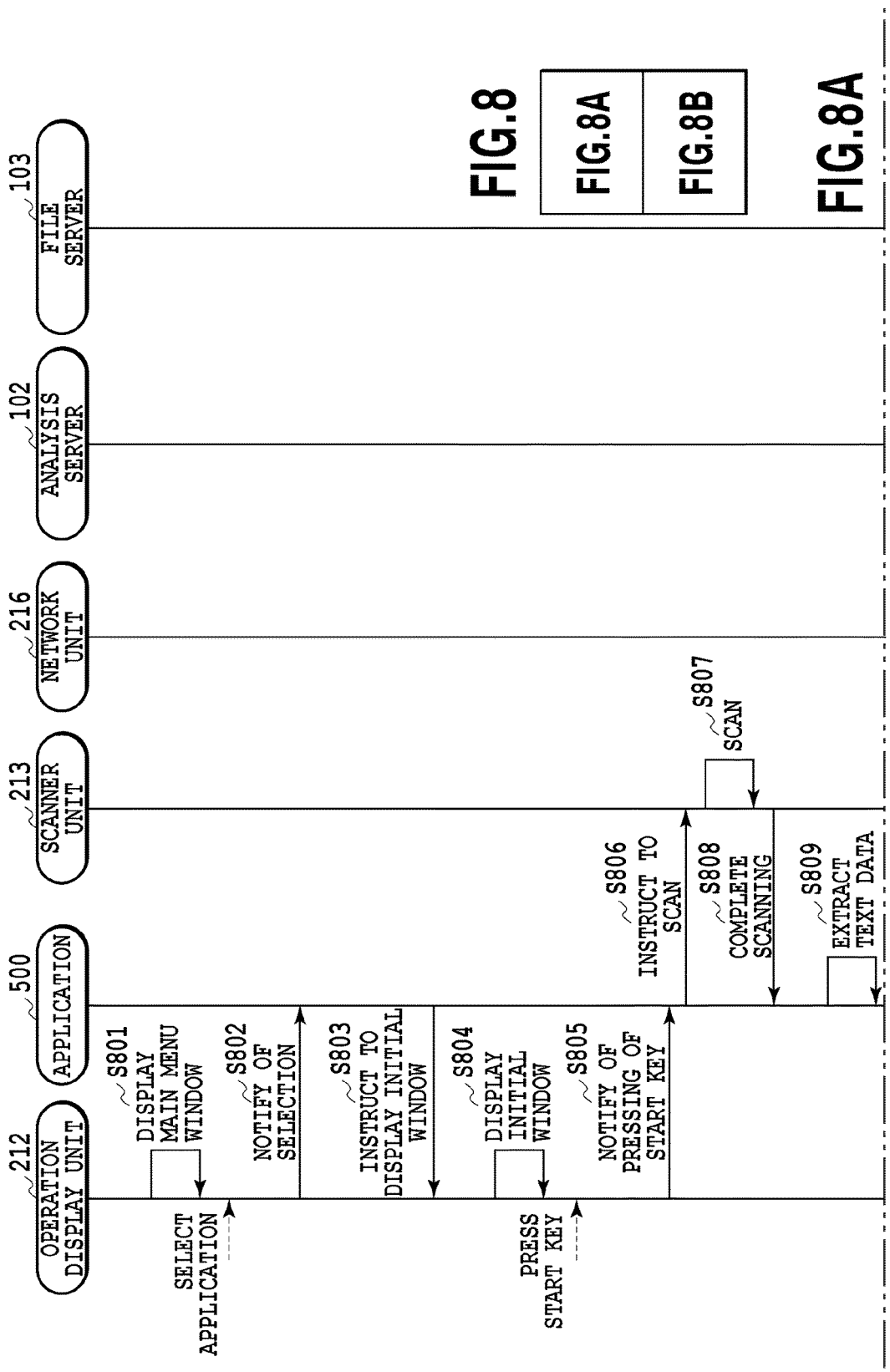

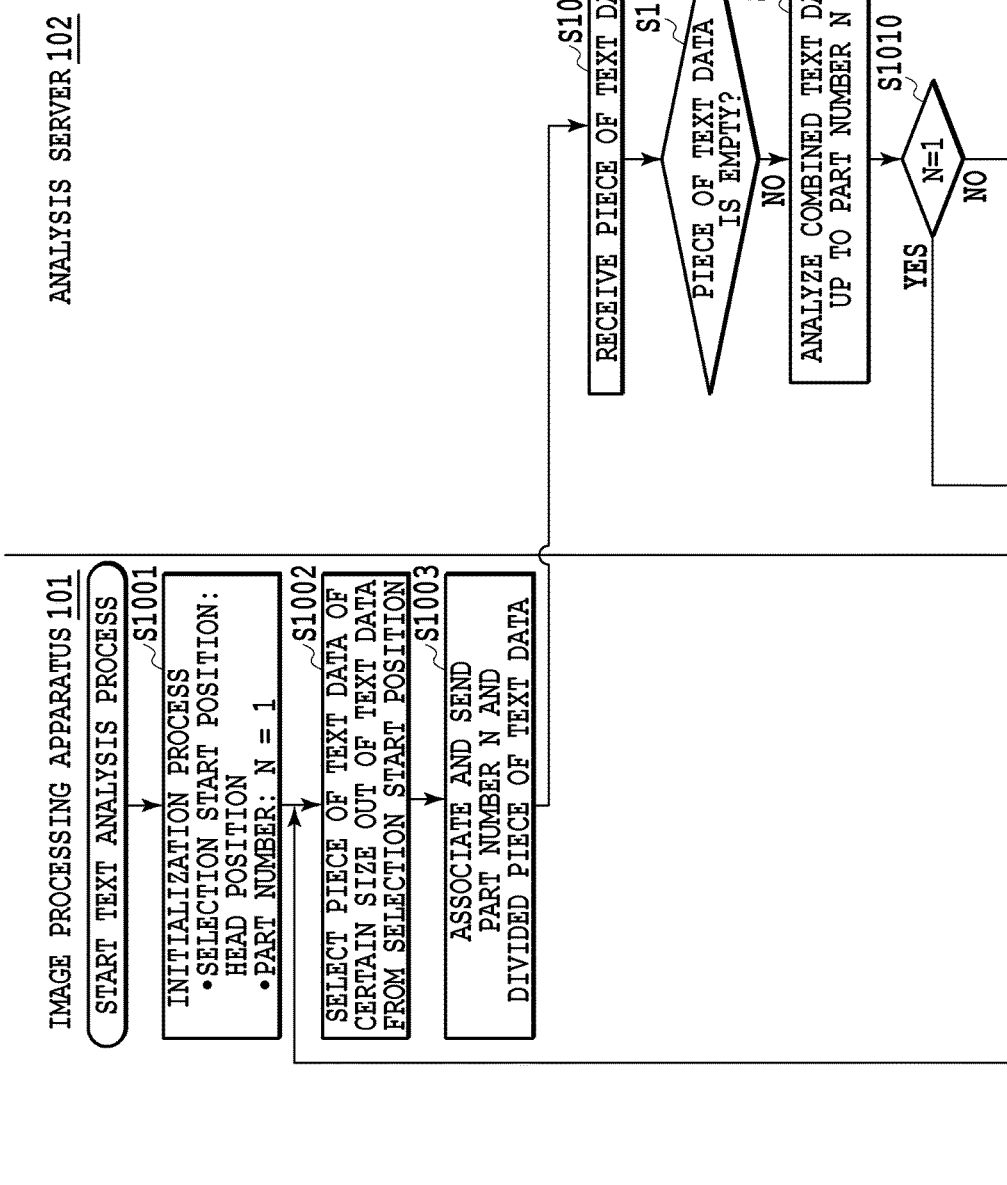

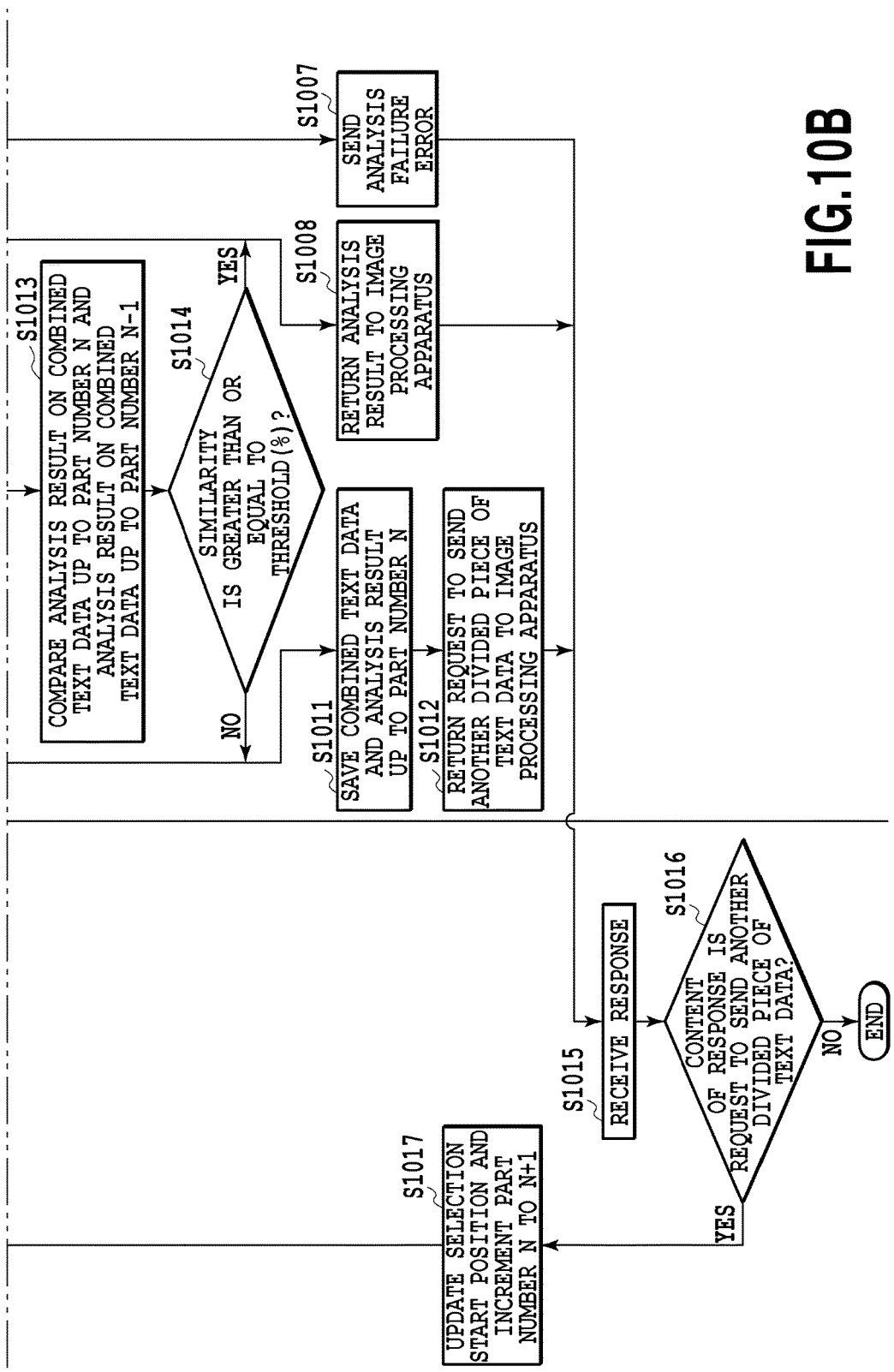

FIG.11
| FIG.11A |
|---|
| FIG.11B |
FIG.11A
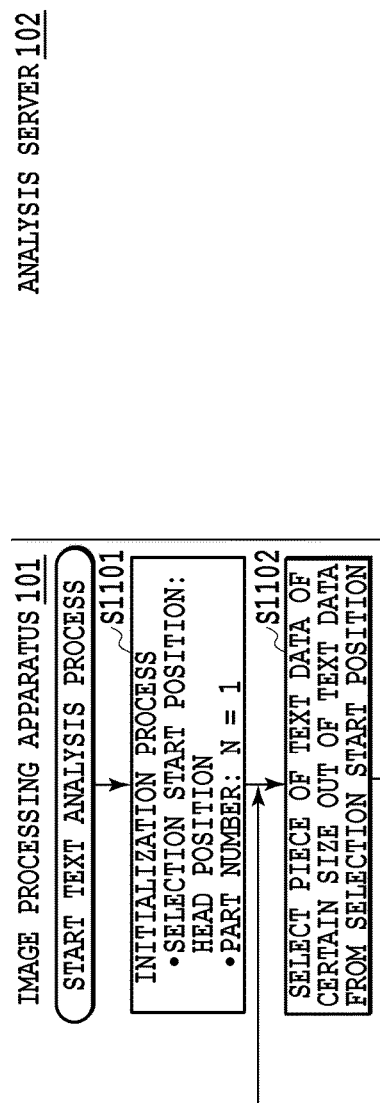
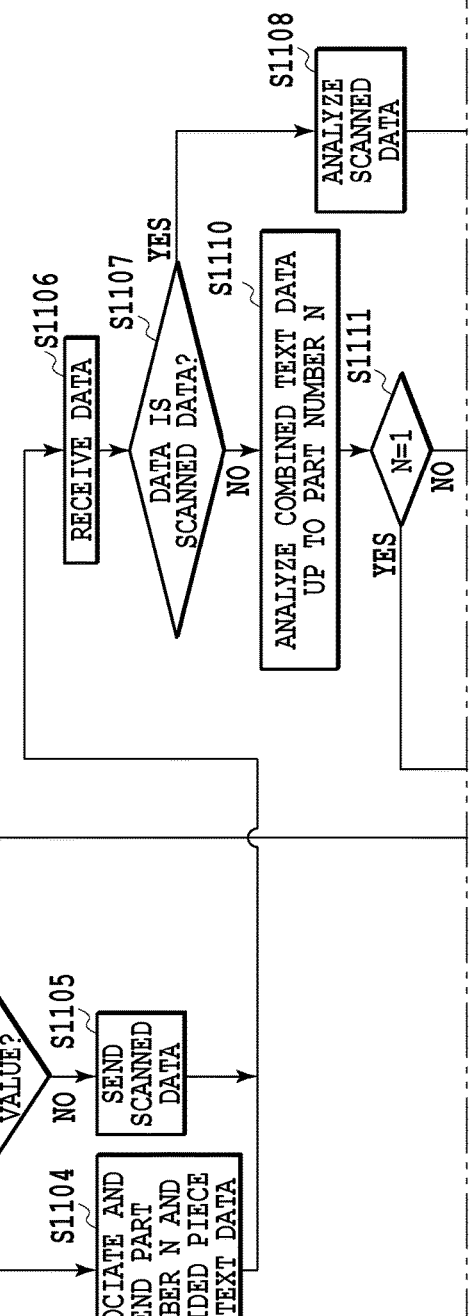

DOCUMENT ANALYSIS SYSTEM, IMAGE FORMING APPARATUS, AND ANALYSIS SERVER

BACKGROUND OF THE INVENTION

Field of the Invention

The present invention relates to a technique of storing image data obtained by scanning into a predetermined storage location.

Description of the Related Art

In recent years, in business fields such as law firms which handle large amounts of paper documents, systems have been considered which utilize an image processing apparatus equipped with a scanning function to convert paper documents to electronic image data, and sort and manage the image data of the paper documents in storage locations related thereto. To select a storage location to store the image data of a scanned paper document, a method has been employed in which the user specifies a storage location manually or selects a storage location by utilizing the history of storage locations used in the past, bookmarks registered in advance, or the like.

Also, a method has been considered which involves searching for attribute information on storage locations by using strings extracted from document data, and presenting storage locations identified based on the search result to the user as candidate storage locations (see Japanese Patent Laid-Open No. 2008-234078).

Here, an image processing apparatus may send text data of a paper document, which the image processing apparatus has obtained by scanning, to an information processing apparatus as described in Japanese Patent Laid-Open No. 2008-234078, and the information processing apparatus may notify the sender of candidate storage locations. In such a method, however, the processing may take time. For example, in a case where the number of pages of a scanned paper document is large, the information processing apparatus may have to perform the search process after waiting for all the pieces of text data to be received or may require time to perform the search process based on the large amount of text data. Thus, there has been a problem in that it takes time before appropriate storage locations are presented to the user.

SUMMARY OF THE INVENTION

A document analysis system according to the present invention is a document analysis system, including: an image processing apparatus; and an analysis server, in which the image processing apparatus includes: an extraction unit configured to extract text data from image data obtained by scanning a document; a first sending unit configured to sequentially send divided pieces of the text data to the analysis server until a candidate storage location for the image data is received from the analysis server; a selection unit configured to present the candidate storage location, which is received from the analysis server, and prompts a user to select a storage location; and a second sending unit configured to send the image data to the storage location selected by the user, and wherein the analysis server includes: an analysis unit configured to obtain the candidate storage location by sequentially analyzing the divided pieces of the text data, which are sequentially sent from the first sending unit; and a return unit configured to return the candidate storage location to the image processing apparatus when the analysis unit obtains the candidate storage location.

Further features of the present invention will become apparent from the following description of exemplary embodiments (with reference to the attached drawings).

BRIEF DESCRIPTION OF THE DRAWINGS

FIG. 8 is a diagram showing the relationship between FIGS. 8A and 8B;

FIGS. 8A and 8B are totally a sequence chart of processing in the embodiment;

FIG. 10 is a diagram showing the relationship between FIGS. 10A and 10B;

FIGS. 10A and 10B are totally a flowchart of a text analysis process in the embodiment;

FIG. 11 is a diagram showing the relationship between FIGS. 11A and 11B; and FIGS. 11A and 11B are totally a flowchart showing a process in another embodiment in which data to be sent is changed based on text size.

DESCRIPTION OF THE EMBODIMENTS

Embodiments of the present invention will be described below with reference to the drawings. Note that the configurations to be shown in the following embodiments are mere examples, and the present invention is not limited to the shown configurations.

Embodiment 1

Figure 1:
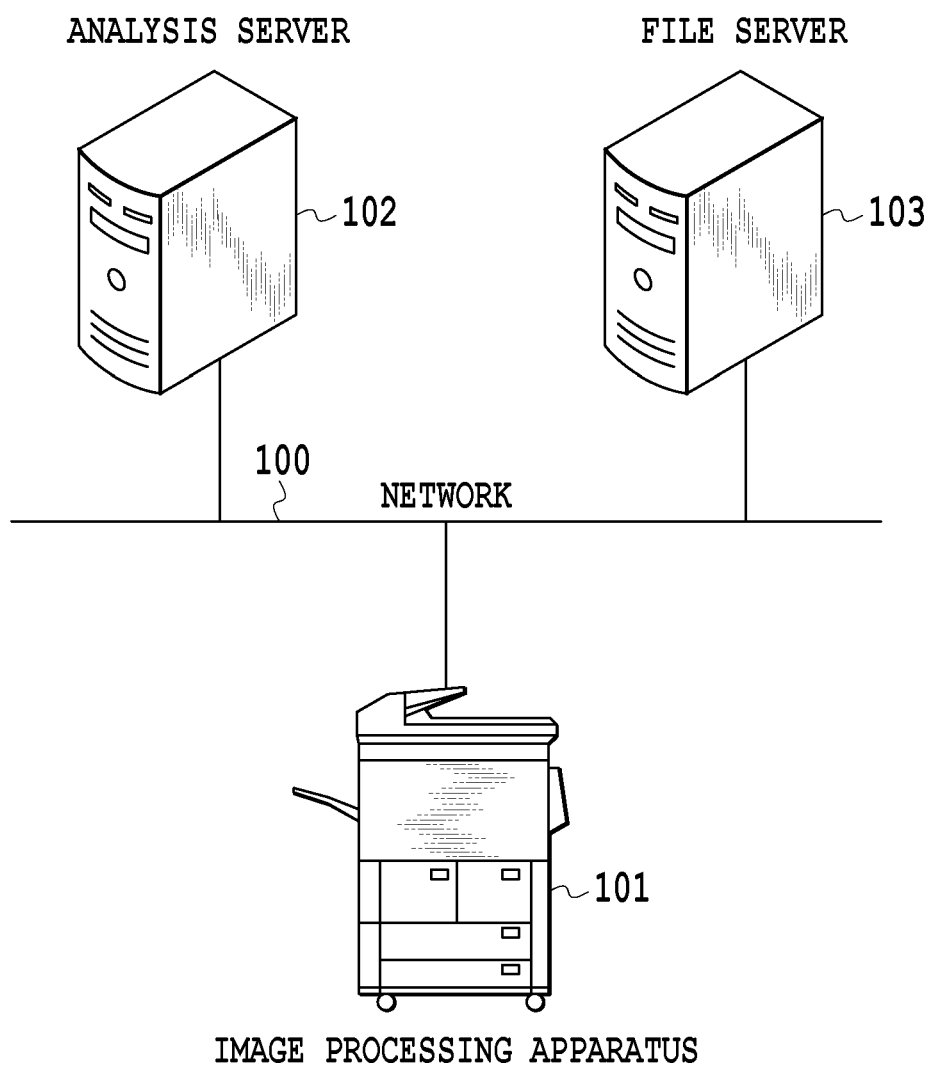
FIG. 1 is a diagram showing a configuration example of a system according to an embodiment.

FIG. 1 is a configuration example showing an example of a document analysis system in this embodiment. This system includes an image processing apparatus 101, an analysis server 102, and a file server 103 connected to each other by a network 100. The network 100 is an infrastructure for performing communication between these apparatuses and may be an intranet, the Internet, or a different network system.

The image processing apparatus 101 is constituted as, for example, a multifunction peripheral (MFP) equipped with a web browser function or the like. Also, the image processing apparatus 101 may be managed with a local IP address. In that case, a gateway (not shown) is present between the network 100 and the image processing apparatus 101, and the gateway performs address translation. The gateway includes a router, for example. Also, the gateway or the image processing apparatus 101 may be equipped with a firewall function. The analysis server 102 functions to obtain files stored in the file server 103, extract keywords therefrom, and store them in a database (DB). The analysis server 102 also functions to compare the keywords stored in the DB and a keyword extracted from comparison-target text data and present candidate storage locations where files similar to the text data are stored. The file server 103 functions to save files such as image data obtained by scanning paper documents. The file server 103 stores a file or obtains and sends a stored file upon request from the image processing apparatus 101 or the analysis server 102.

Figure 2:
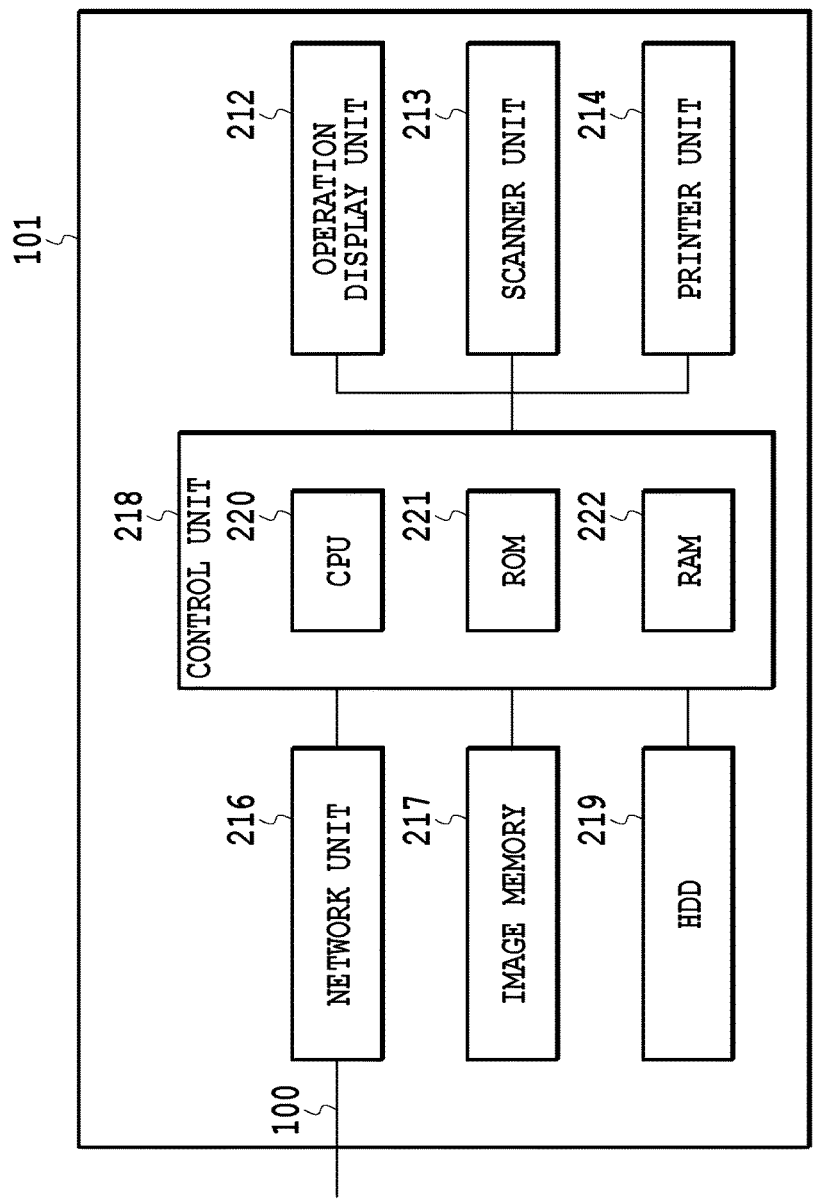
FIG. 2 is a block diagram showing the hardware configuration of an image processing apparatus in the embodiment.

FIG. 2 is an exemplary block diagram showing the hardware configuration of the image processing apparatus 101. The image processing apparatus 101 includes a control unit 218, a network unit 216, an image memory 217, a HDD 219, an operation display unit 212, a scanner unit 213, and a printer unit 214. The control unit 218 includes a CPU 220, a ROM 221, and a RAM 222.

The control unit 218 is configured to control the entire operation of the image processing apparatus 101. The CPU 220 is configured to read out a control program stored in the ROM 221 and performs various control processes such as readout control and send control. The RAM 222 is used as a temporally storage area such as a main memory or a work area for the CPU 220. The control unit 218 is also configured to control the operation of the operation display unit 212, the scanner unit 213, the printer unit 214, and the network unit 216. The control unit 218 is further configured to read out various types of data from the image memory 217 and the HDD 219 and write various types of data onto the image memory 217 and HDD 219.

In the operation display unit 212, a display unit such as a liquid crystal display equipped with a touch-screen function, a keyboard, and other relevant components are disposed. The operation display unit 212 displays an operation window on the operation display unit 212. The scanner unit 213 is configured to generate image data by scanning an image of a document and output the image data to the control unit 218. The printer unit 214 is configured to print the image data, which is outputted from the control unit 218, onto a sheet.

The network unit 216 is configured to send, to a specified location, text data extracted from saved image data read by the scanner unit 213. The network unit 216 is also configured to receive print image data from an external information processing apparatus (not shown) and receive image data to be displayed on the operation display unit 212 by connecting the control unit 218 to the network 100.

The HDD 219 is configured to store image data and various programs. The various programs in this embodiment are also stored in the HDD 219. Note that print image data received from the external information processing apparatus is temporarily stored in the image memory 217 and printed by the printer unit 214 via the control unit 218.

Figure 3:
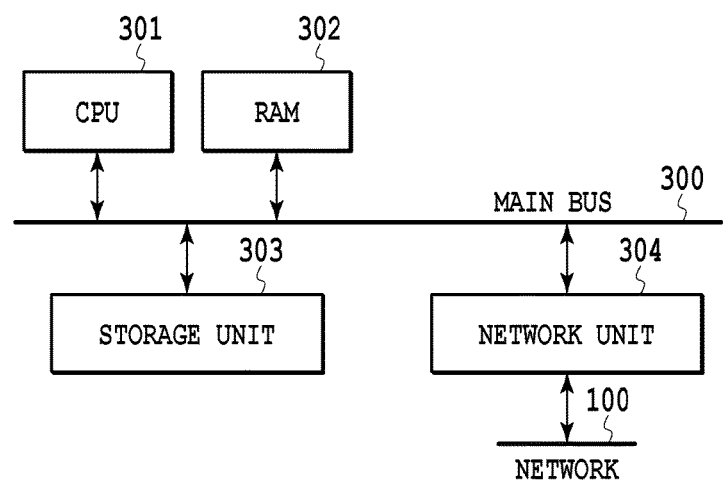
FIG. 3 is a diagram showing the hardware configuration of each of an analysis server and a file server in the embodiment.

FIG. 3 is an exemplary hardware configuration diagram of each of the analysis server 102 and the file server 103 in this embodiment. Each of the analysis server 102 and the file server 103 includes: a CPU 301 configured to control the server; a RAM 302 providing a work area for the CPU 301; a storage unit 303 configured to store programs that run on the server and settings; and a network unit 304 configured to perform communication with other apparatuses via the network 100; and a main bus 300.

Note that, unless otherwise noted, this embodiment is implemented such that the CPU 301 controls the RAM 302, the storage unit 303, and the network unit 304 via the main bus 300.

Figure 4:
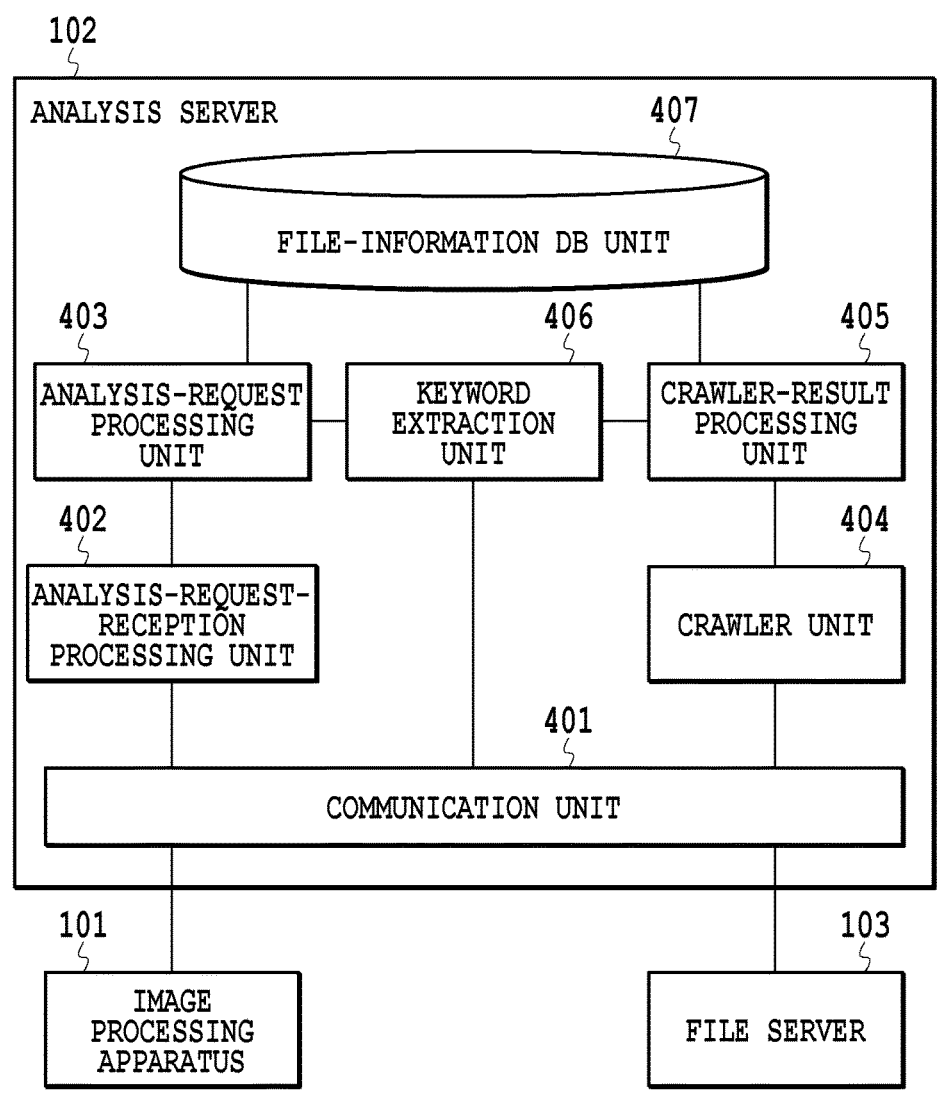
FIG. 4 is a diagram for describing the software configuration of the analysis server in the embodiment.

FIG. 4 is a diagram for describing the software configuration of the analysis server 102 in this embodiment. Each functional unit shown in FIG. 4 is implemented by a control program run by the CPU 301 of the analysis server 102.

The analysis server 102 includes a communication unit 401, an analysis-request-reception processing unit 402, an analysis-request processing unit 403, a crawler unit 404, a crawler-result processing unit 405, a keyword extraction unit 406, and a file-information DB unit 407.

The crawler unit 404 is configured to collect the files (electronic data) stored in the file server 103 and information indicating the storage locations of the files via communication unit 401. Each storage location is, for example, a folder in which a file is stored. The information indicating this storage location is the name of the folder, information on the path to the folder, or the like. The crawler unit 404 is configured to collect information on new files to be stored in the file server 103 or updated files. The crawler unit 404 does not collect information on files that are already collected. The crawler unit 404 is configured to pass the collected files and their storage location information to the crawler-result processing unit 405.

The crawler-result processing unit 405 is configured to pass the files received from the crawler unit 404 to the keyword extraction unit 406 and receive keyword extraction results extracted from the files as a response. The crawler-result processing unit 405 is configured to then save the keyword extraction results, which are received from the keyword extraction unit 406, and the corresponding storage location information into the file-information DB unit 407. Thus, in the file-information DB unit 407, appropriate keywords corresponding to files stored in their respective storage locations are saved in association with their storage location information.

The keyword extraction unit 406 is configured to perform a process of extracting keyword information from text data or file received. The keyword extraction unit 406 is also configured to perform a process of counting the number of appearances of a keyword or the like. For example, the keyword extraction unit 406 extracts a keyword from the property information of the file or analyzes the text data of the document file. The keyword extraction unit 406 then performs a process of extracting a compound noun or the like that frequently appears in technical terminology as a keyword by utilizing a statistical index such as the frequency of appearance. The keyword extraction unit 406 also performs the process of analyzing text data and extracting a keyword upon request from the analysis-request processing unit 403 to be described later.

The analysis-request-reception processing unit 402 is configured to receive a request to analyze text data from the image processing apparatus 101 via the communication unit 401. This text data from the image processing apparatus 101 is text data extracted from an image scanned by the image processing apparatus 101 through a character recognition process (OCR process). In sum, the analysis-request-reception processing unit 402 receives text data extracted by the image processing apparatus 101 through the OCR process from an image scanned by the image processing apparatus 101. The analysis-request-reception processing unit 402 is also configured to perform a process of sending the image processing apparatus 101 an analysis result as a response which is obtained by a process by the analysis-request processing unit 403 to be described below.

The analysis-request processing unit 403 is configured to pass the text data received by the analysis-request-reception processing unit 402 to the keyword extraction unit 406 and receive the result of keyword extraction from the text data. The analysis-request processing unit 403 is also configured to perform a process of obtaining information such as keywords in the files stored in the file-information DB unit 407 and comparing them with the result of the keyword extraction from the received text data. The analysis-request processing unit 403 is configured to pass a list to the analysis-request-reception processing unit 402 as an analysis result after the comparison, the list indicating candidate storage locations in which to store files associated with keywords similar to the keyword in the received texted data.

Figure 5:
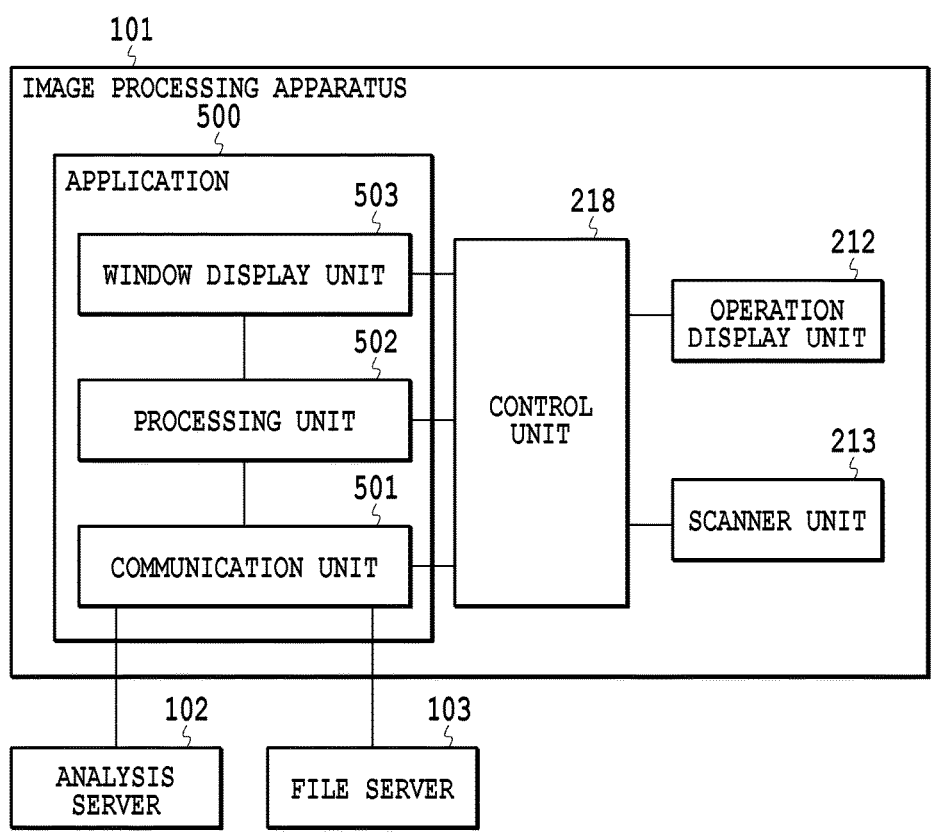
FIG. 5 is a diagram for describing the software configuration of an application provided to the image processing apparatus in the embodiment.

FIG. 5 is a diagram for describing the software configuration of an application 500 for the analysis server 102 provided to the image processing apparatus 101 in this embodiment. The application 500 is stored in the ROM 221 and run by the CPU 220 in the image processing apparatus 101. The application 500 includes a communication unit 501, a processing unit 502, and a window display unit 503.

The processing unit 502 is configured to communicate with the analysis server 102 and the file server 103 via the communication unit 501. Note that the sequence of a series of processes in which the processing unit 502 is centrally involved will be described later with reference to FIGS. 8A and 8B. As a main process, the processing unit 502 firstly instructs the scanner unit 213 to perform scanning, via the control unit 218 of the image processing apparatus 101. The processing unit 502 then sends the analysis server 102 text data extracted through the OCR process from scanned image data (electronic data) which is obtained by the scanner unit 213 through the scanning of a paper document or the like. The processing unit 502 then receives an analysis result as a response. The analysis result is candidate-storage-location information, as mentioned above. The processing unit 502 then sends the scanned image data, which is obtained by the scanning by the scanner unit 213, to a storage location in the file server 103 selected based on the candidate-storage-location information, and instructs the file server 103 to store the file there. Hereinafter, the scanned image data will be simply referred to as the scanned data.

The window display unit 503 is configured to perform a process of displaying a window on the operation display unit 212 to the user. Specifically, the window display unit 503 displays an operation window and makes a process request to the processing unit 502 in accordance with the user's operation on the operation window.

Figure 6:
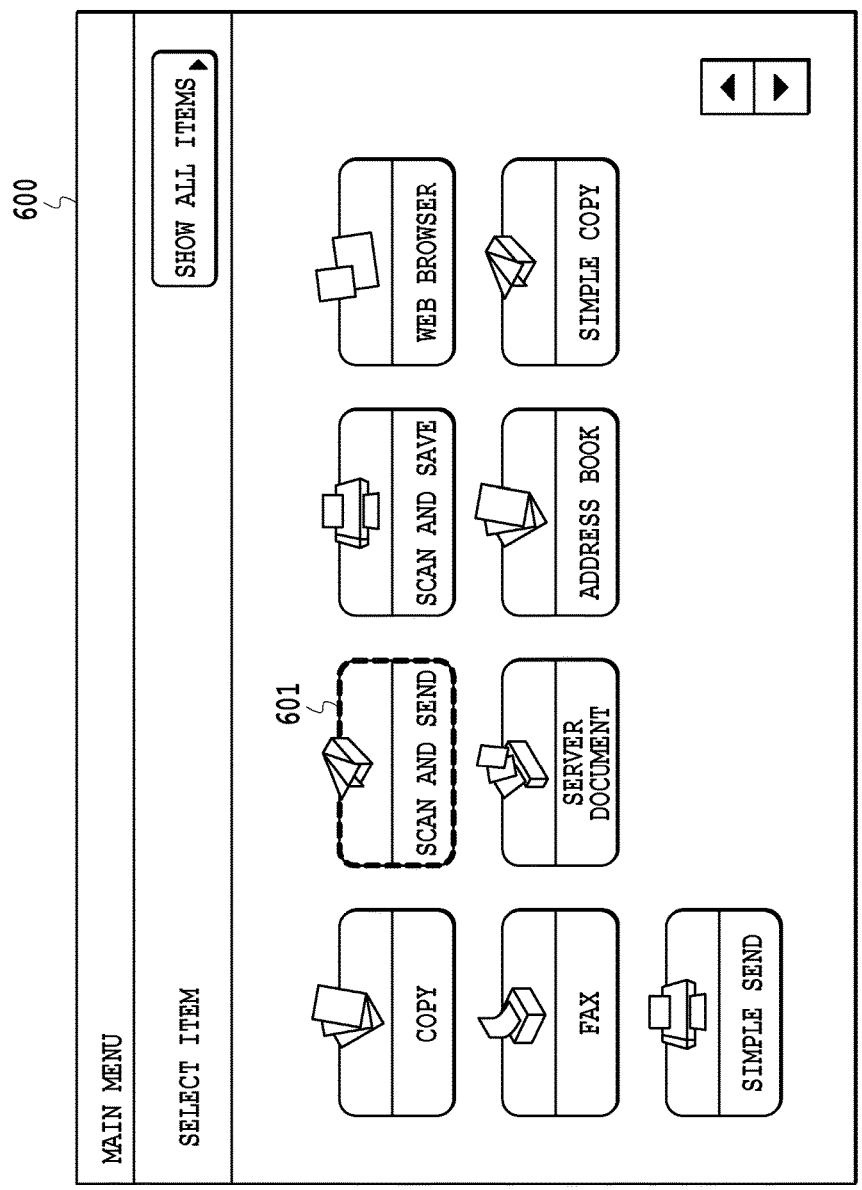
FIG. 6 is an example of an operation display unit of the image processing apparatus in the embodiment.

FIG. 6 is an example of an operation window 600 displayed on the operation display unit 212 of the image processing apparatus 101 in this embodiment. In this operation window 600, buttons are displayed through which applications available on the image processing apparatus 101 can be accessed. Upon pressing of a button by the user, the pressed application starts. Note that this operation window 600 is a main menu window displayed upon pressing of a main menu key (not shown) provided to the image processing apparatus 101. Upon pressing of a button 601, for example, a "SCAN AND SEND" application is displayed.

Figure 7:
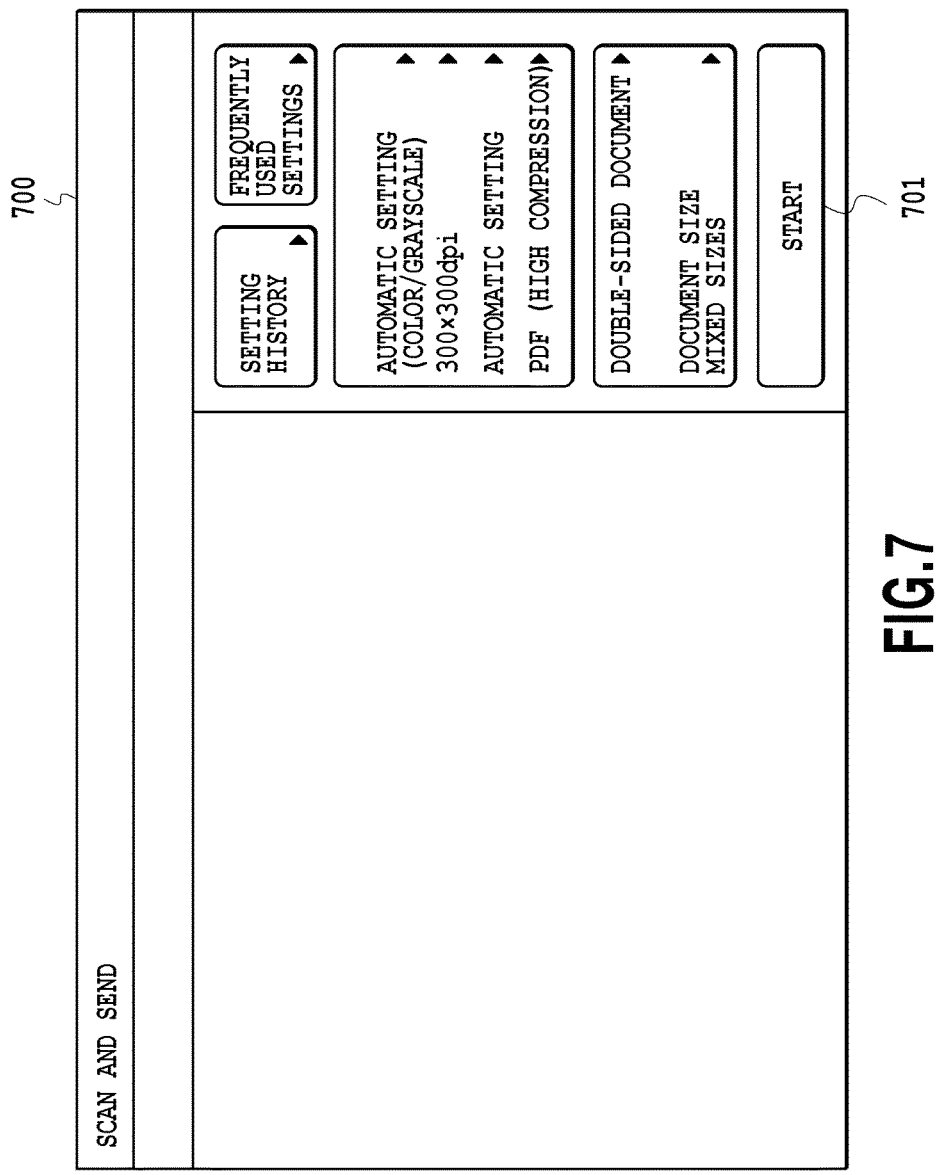
FIG. 7 is an example of the operation display unit of the image processing apparatus in the embodiment.

FIG. 7 is an example of the operation display unit 212 of the image processing apparatus 101 in this embodiment and is an example of a window of the application 500 for the user utilize to scan a document and send the scanned document. The scanning is performed upon pressing of a start key 701 by the user with the document set on the scanner unit 213.

Figure 8B:
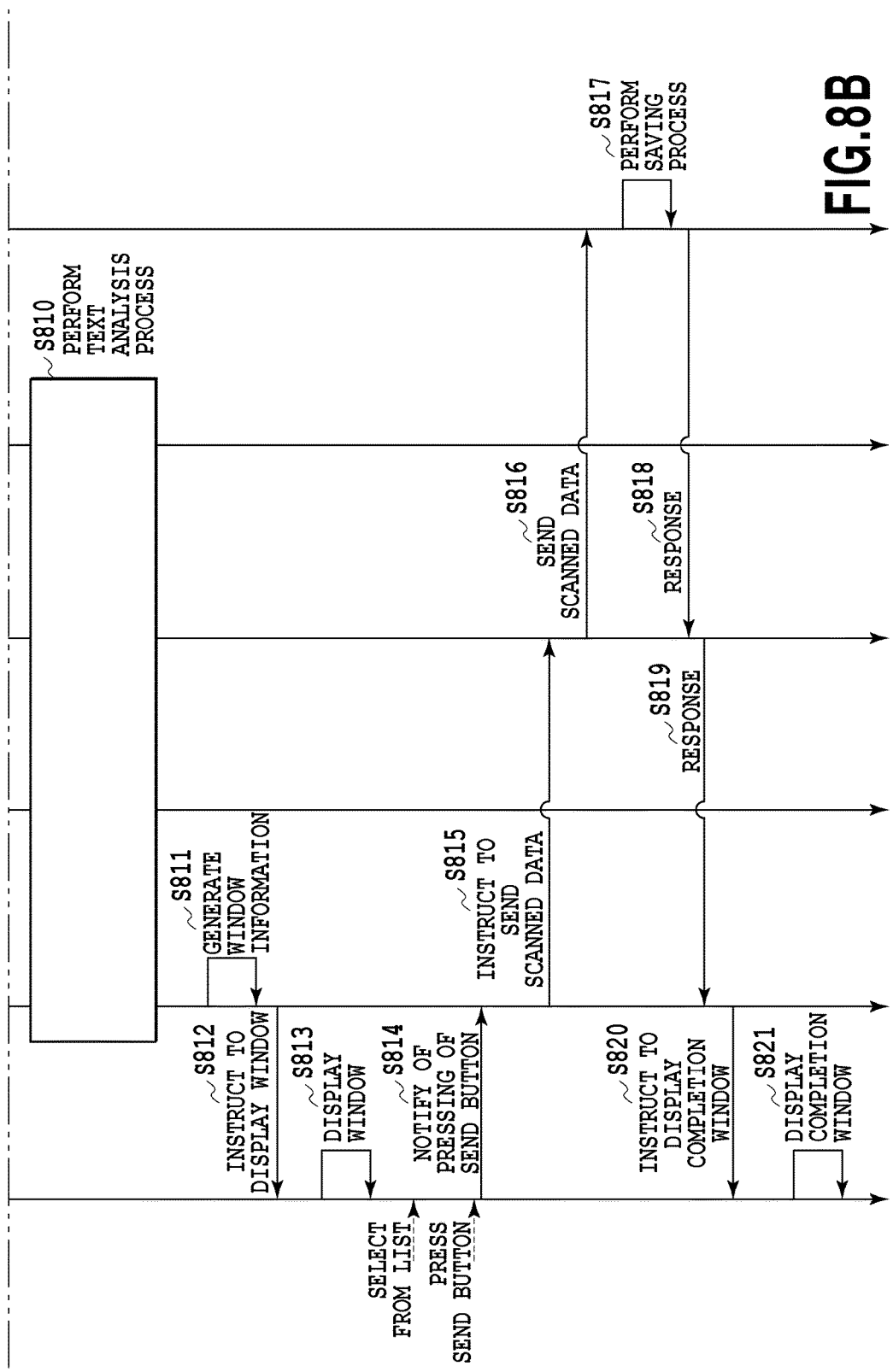

FIGS. 8A and 8B are totally a sequence chart from the scanning of a document upon use of the operation window of the application 500, which is shown in FIG. 7, by the user to the storing of the scanned data into the file server 103 in this embodiment. The processing will be described from a point where the operation window 600, shown in FIG. 6, is displayed upon pressing of the main menu key (not shown) of the image processing apparatus 101 by the user.

In Step S801, the operation display unit 212 displays the main menu window, which is shown in FIG. 6. Upon pressing of a button corresponding to the application 500 on the displayed window by user operation, the operation display unit 212 notifies the application 500 in Step S802 that the application is selected. In Step S803, in response to the notification, the application 500 sends information on an initial window of the application 500 to the operation display unit 212 and instructs the operation display unit 212 to display the initial window. In Step S804, the operation display unit 212 displays the received initial window. Then, upon pressing of the start key of the application 500 by user operation with a document placed on the scanner unit 213, the operation display unit 212 notifies the application 500 in Step S805 that the start key is pressed. In Step S806, in response to the notification that the start key is pressed, the application 500 instructs the scanner unit 213 to perform scanning. In Step S807, the scanner unit 213 scans the document to generate scanned data (electronic data). In Step S808, the scanner unit 213 notifies the application 500 that the scanning is finished. In Step S809, in response to the notification that the scanning is finished, the application 500 performs text extraction from the scanned data, which is generated by the scanner unit 213 in Step S807. Specifically, in Step S809, the application 500 extracts text data by performing the character recognition process (OCR process) on the scanned data.

In Step S810, the application 500 sends the extracted text data to the analysis server 102 and obtains an analysis result (candidate-storage-location information for the scanned data) as a response. Note that details of the process in Step S810 will be described later with reference to FIGS. 10A and 10B.

In Step S811, the application 500 generates information on a window for prompting the user to select a storage location, based on the candidate-storage-location information, which is obtained in Step S810. In Step S812, the application 500 instructs the operation display unit 212 to display the window. In Step S813, the operation display unit 212 displays the window. An example of the window generated based on the candidate-storage-location information will be described with reference to FIG. 9.

Figure 9:
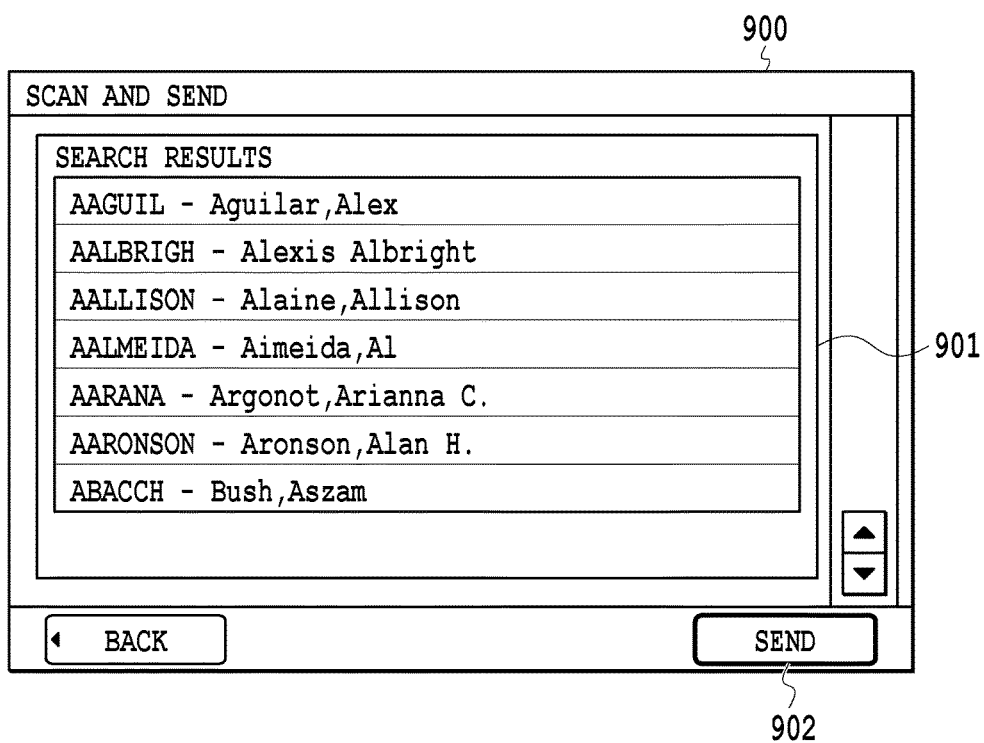
FIG. 9 is an example of a window for prompting the user to select appropriate storage location information from among candidate storage locations.

FIG. 9 is a diagram showing an example of the window generated based on the candidate-storage-location information, which is the result of the analysis by the analysis server 102, in this embodiment. A window 900 is a window for prompting the user to select an appropriate storage location from among candidate storage locations. In the window 900, candidate storage locations 901 are displayed. In this example, the folder names of storage locations are stored. The user selects a desired storage location from among the candidate storage locations 901 and presses a send button 902. As a result, the scanned data, which is obtained in Step S808, is sent to the file server 103.

Referring back to FIGS. 8A and 8B, the sequence will be described further. Upon selection of a candidate location and pressing of the send button by user operation, the operation display unit 212 notifies the application 500 in Step S814 that the send button is pressed. In Step S815, in response to the notification, the application 500 instructs the network unit 216 to send the scanned data, the instruction including specification of the storage location. In Step S816, in response to the instruction, the network unit 216 sends the scanned data, which is generated by the scanner unit 213, to file server 103. In Step S817, upon receipt of the scanned data, the file server 103 stores the scanned data into the specified saving location. In Step S818, the file server 103 returns a response indicating that the saving process is finished. In Step S819, the network unit 216 returns a response to the application 500. In Step S820, the application 500 instructs the operation display unit 212 to display a send completion window. In Step S821, the operation display unit 212 displays the completion window and ends the processing.

FIGS. 10A and 10B are totally a flowchart showing the text analysis process in Step S810 in FIG. 9 in this embodiment.

An overview of the text analysis process will be briefly described before describing the flowchart. In the text analysis process in this embodiment, the entire text data, which is extracted by the image processing apparatus 101, is not sent to the analysis server 102. Instead, pieces of the text data are selected and sequentially sent as needed. First, the analysis server 102 finds a first analysis result by using a first selected piece of the text data. The analysis server 102 then combines the first piece of the text data with a second piece of the text data which a selected piece of the text data sent following the first piece, and finds a second analysis result by using the combined text data. In a case where the first analysis result and the second analysis result are similar, no further analysis is made, and the second analysis result is sent to the image processing apparatus 101. Generally, documents tend to contain an important keyword(s) in the introduction part and/or the first few pages, and similar keywords tend to be extracted after certain pages. With this taken into consideration, in this embodiment, the image processing apparatus 101 performs a process of sending pieces of the extracted text data as needed to the analysis server 102, instead of sending the entire text data, and receiving an analysis result. By avoiding sending the entire text data and avoiding an analysis process based on the entire text data as described above, it is possible to quickly present an analysis result to the user. The text analysis process will now be specifically described along the flowchart.

First, in Step S1001, the image processing apparatus 101 performs an initialization process. In the initialization process, a part number N is initialized to 1, and a selection start position to be used to select a piece of the text extracted by the image processing apparatus 101 is initialized to a head position. The part number represents a sequential number assigned to the selected piece of the text. In this embodiment, the image processing apparatus 101 sends pieces of the extracted text data to the analysis server 102 instead of sending the entire extracted text data. For this reason, the part number is used as an identifier to identify the selected piece of the text data to be sent.

In Step S1002, from the extracted text data, the image processing apparatus 101 selects a piece of text data of a certain size from the selection start position. The piece of text data of the certain size will be hereinafter referred to as "divided piece of text data." Note that the certain size may be a certain number of text characters or a certain data size of text data. The size of the selection and the method of setting the size can be optionally determined. In Step S1003, the image processing apparatus 101 associates the divided piece of text data, which is selected in Step S1002, with the part number and sends them to the analysis server 102.

In Step S1004, the analysis server 102 receives the divided piece of text data, which is sent from the image processing apparatus 101. In Step S1005, the analysis server 102 determines whether or not the received divided piece of text data is empty. The divided piece of text data is empty, for example, in a case where the number of text characters contained in the divided piece of text data is zero, in a case where the data size of the divided piece of text data is less than a predetermined value, or in other similar cases.

If determining in Step S1005 that the received divided piece of text data is empty, the analysis server 102 determines in Step S1006 whether or not N=1, i.e. whether or not the divided piece of text data has been sent upon the first send request. If determining in Step S1006 that N=1, the analysis server 102 returns an analysis-failure-error notification to the image processing apparatus 101 as a response in Step S1007 since there is no text to analyze. On the other hand, if determining in Step S1006 that N≠1, the analysis server 102 determines that there is no text the image processing apparatus 101 can select. Then in Step S1008, the analysis server 102 returns the analysis result on the last part number (i.e. the analysis result up to the part number N−1) to the image processing apparatus 101 as a response.

If determining in Step S1005 that the divided piece of text data is not empty, the analysis server 102 analyzes combined text data in Step S1009, the combined text data being obtained by combining all the divided pieces of text data up to the part number N. If determining in Step S1010 that N=1, i.e. the divided piece of text data is the first divided piece of text data, the analysis server 102 saves the piece of text data with the part number 1 and the analysis result into the file-information DB unit 407 in Step S1011. Then in Step S1012, the analysis server 102 sends a request to send another divided piece of text data, to the image processing apparatus 101 as a response. In this embodiment, the divided pieces of text data are sequentially sent as needed from the image processing apparatus 101. For this reason, the analysis result on the piece of text data with the part number 1, which is the first divided piece of text data, is not sent to the image processing apparatus 101 but is saved into the file-information DB unit 407.

The analysis server 102 determines in Step S1010 that N≠1, in a case where there has been a valid piece(s) of text data up to the last turn (part number N−1) and also the analysis result on the piece(s) of text data up to the part number N−1 has been saved. Thus, if determining in Step S1010 that N≠1, the analysis server 102 compares in Step S1013 the analysis result up to the part number N and the analysis result up to the part number N−1, which is saved in the file-information DB unit 407, i.e. the analysis result up to the last turn. If the comparison result is a result less than a threshold in Step S1014, an additional analysis is necessary, and the process therefore continues from Step S1011. Specifically, as mentioned above, the combined text data up to the part number N and its analysis result are saved in Step S1011, and a request to send another divided piece of text data is sent to the image processing apparatus 101 as a response in Step S1012.

On the other hand, if the comparison result is a result greater than or equal to the threshold in Step S1014, the analysis server 102 sends the analysis result on the part number N to the image processing apparatus 101 as a response in Step S1008. As mentioned earlier, an analysis result is information indicating candidate storage locations. More specifically, an analysis result can be a list of storage location folders arranged in descending order of similarity. Here, a folder with high similarity can be a folder "containing many files related to the text data," a folder "containing a file(s) highly related to the text data," or the like. The analysis result on the part number N is sent to the client if, for example, the entities and order of the candidate storage locations on the list remain to hold a similarity greater than or equal to the threshold (i.e. become substantially unchanged) in Step S1014. In short, the analysis process is terminated at this point since any further analysis on the text data is practically unnecessary, as mentioned above. On the other hand, if the result of the comparison between the last analysis result and the present analysis result is less than the threshold (if the content of the candidate-storage-location list is different from the last one and the present one), the analysis process is performed further. In other words, the analysis is performed by adding pieces of text data until a stable analysis result is obtained.

In Step S1015, the image processing apparatus 101 receives the response from the analysis server 102. In Step S1016, the image processing apparatus 101 analyzes the content of the received response. If determining in Step S1016 that the content of the response is a request to send another divided piece of the text data, the image processing apparatus 101 performs in Step S1017 a process of incrementing the part number and a process of moving the selection start position to the position at which the last selection is finished. After the processes in Step S1017, the image processing apparatus 101 continues the text analysis process from Step S1002. If determining in Step S1016 that the content of the response is an analysis result or an analysis failure error, the image processing apparatus 101 ends the text analysis process and continues the processing from Step S811 in FIG. 8B.

As described above, in this embodiment, pieces of text data selected from the text data, which is extracted from the scanned data, obtained by the image processing apparatus 101 through scanning, are sequentially send to the analysis server 102 as needed. Then, when the result of analysis by the analysis server 102 becomes substantially unchanged, that analysis result is sent to the image processing apparatus 101 as candidate-storage-location information. In this way, the time taken to present candidate storage locations to the user can be shortened.

Embodiment 2

In Embodiment 1, the description has been given of the instance where the analysis result on the divided piece(s) of text data, which is (are) sent by the application 500, up to the part number N and the analysis result on the divided piece(s) of text data up to the part number N−1 are compared with each other and, in the case where the similarity therebetween is greater than or equal to the threshold (%) (i.e. becomes substantially unchanged), the former analysis result is returned. However, if the size of text data extracted from electronic data or the size of a divided piece of text data selected therefrom is small, it is highly likely that the analysis on such text data by the analysis server 102 will not provide an expected result. In this embodiment, description will be given of a process performed in a case where the size of extracted text data or the size of a divided piece of text data is less than a reference value. Specifically, description will be given of an instance in which, in the case where the size of extracted text data or the size of a divided piece of text data is less than a reference value, an image processing apparatus 101 sends the scanned data, which represents an image obtained through scanning, to an analysis server 102 instead of the text data; and the analysis server 102 returns an analysis result based on analysis on the image data instead of analysis on the text data. Note that the configurations of the image processing apparatus 101 and the analysis server 102 and the sequence of processing as a whole can be similar to those in Embodiment 1, and thus description thereof will be omitted below.

Figure 11B:
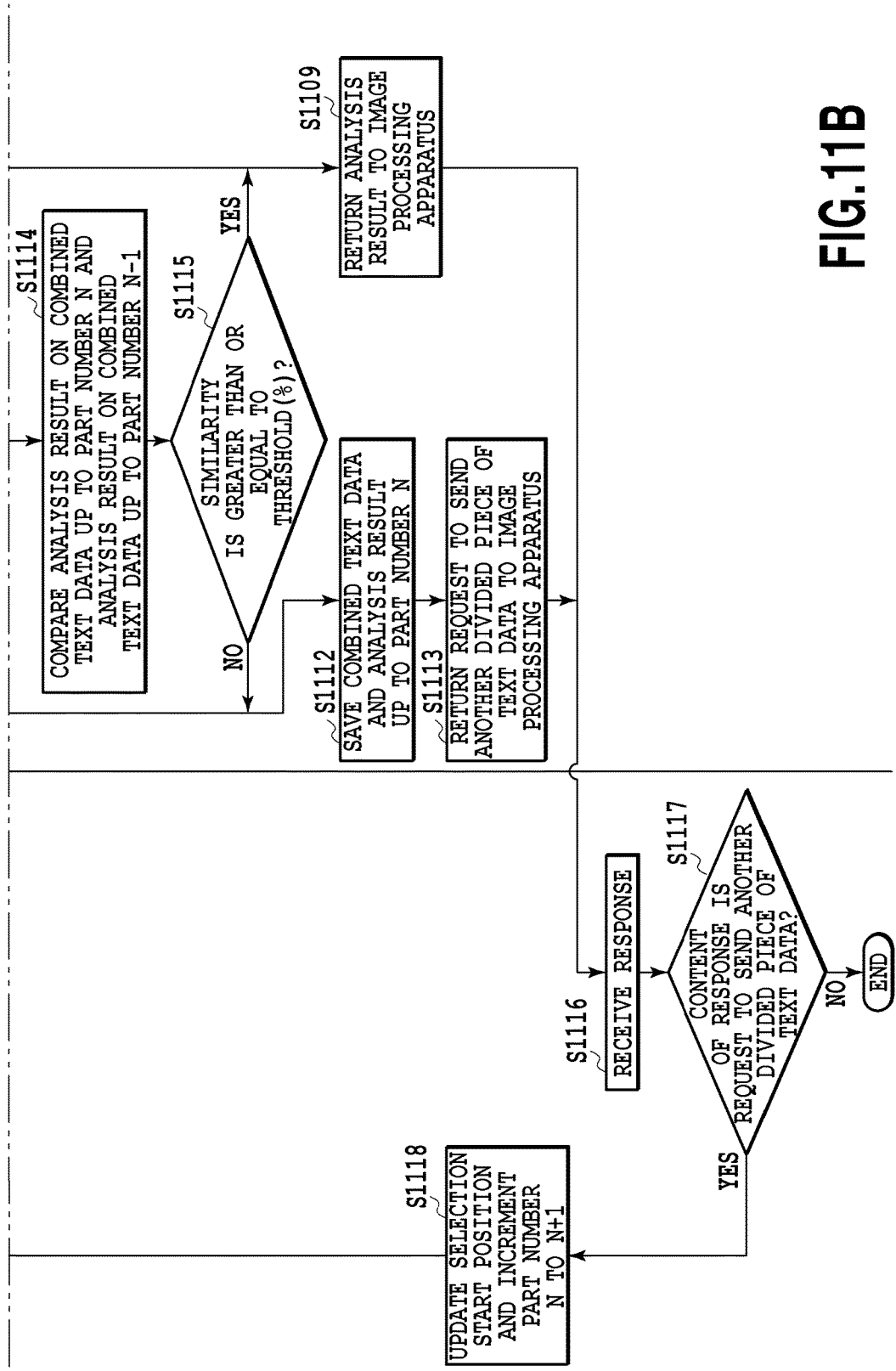

FIGS. 11A and 11B are totally a flowchart showing a process in this embodiment in which the data to be sent from the image processing apparatus 101 to the analysis server 102 in the text analysis process in Step S810 is changed based on the text size.

First, Step S1101 and Step S1102 are similar to Step S1001 and Step S1002. In Step S1103, the image processing apparatus 101 determines whether or not the size of the piece of analysis-target text data, which is selected in Step S1102, is greater than or equal to a reference value. For example, in a case where the reference value indicates a certain number of characters such as 100 characters, the image processing apparatus 101 determines whether or not the number of characters in the divided piece of text data is greater than or equal to 100. Note that the reference value may be a data size of text data.

If determining in Step S1103 that the size of the divided piece of text data is greater than or equal to the reference value, the image processing apparatus 101 associates the divided piece of text data with the part number and sends them to the analysis server 102 in Step S1104, as in Embodiment 1. If determining in Step S1103 that the size of the divided piece of text data is less than the reference value, the image processing apparatus 101 sends the scanned data to the analysis server 102 in Step S1105 instead of the piece of text data, which is extracted from the scanned data.

In Step S1106, the analysis server 102 receives the data sent from the image processing apparatus 101. In Step S1107, the analysis server 102 determines whether or not the received data is the scanned data. If determining in Step S1107 that the received data is the scanned data, the analysis server 102 analyzes the scanned data in Step S1108. In Step S1108, the analysis server 102 analyzes the image data, which is obtained through scanning (scanned data), instead of performing analysis based on the text data as described in Embodiment 1. In this embodiment, the crawler unit 404 collects image data files, and an analysis unit of the analysis server 102, which is not shown, calculates characteristic points of the pieces of image data. The characteristic points are saved into the file-information DB unit 407 in association with the storage locations of the pieces of image data. In Step S1108, the analysis server 102 calculates a characteristic point of the scanned data, which is sent from the image processing apparatus 101, and compares it with the stored characteristic points to obtain as an analysis result, candidate storage locations where files with high similarity are stored.

In Step S1109, the analysis server 102 returns the analysis result on the scanned data, which is obtained in Step S1106, to the image processing apparatus 101.

On the other hand, if determining in Step S1107 that the received data is the piece of text data, the analysis server 102 proceeds to Step S1110. Processes in Step S1110 to S1115 are similar to the processes in Step S1009 to S1014 in Embodiment 1, and thus description thereof will be omitted.

As described above, in this embodiment, in the case where a document with not many characters is scanned, analysis is performed based on image data obtained by the scanning, instead of text data. In this way, accurate candidate storage locations can be presented to the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

With the present invention, it is possible to shorten the time taken to present candidate storage locations on an image processing apparatus after the start of scanning on the image processing apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-094293, filed May 1, 2015, which is hereby incorporated by reference herein in its entirety.

What is claimed is:

1. A document analysis system, comprising:
an image processing apparatus; and
an analysis server, wherein
the image processing apparatus includes:
   a first processor; and
   a first memory configured to store a first program, wherein the first processor executes the first program to perform:
      extracting text data from image data obtained by scanning a document;
      selecting pieces of text data from the extracted text data,
      sequentially sending the selected pieces of the extracted text data to the analysis server until at least one candidate storage location for the image data is received from the analysis server, wherein the sequentially sending process is stopped when receiving the at least one candidate storage location from the analysis server;
      presenting the at least one candidate storage location, which is received from the analysis server;
      prompting a user to select a storage location from the presented at least one candidate storage location; and
      sending the image data to the storage location selected by the user, and
wherein the analysis server includes:
   a second processor; and
   a second memory configured to store a second program, wherein the second processor executes the second program to perform:
      obtaining the at least one candidate storage location by sequentially analyzing the selected pieces of the text data, which are sequentially sent from the image processing apparatus; and
      sending the obtained at least one candidate storage location to the image processing apparatus when the at least one candidate storage location is obtained before receiving all of the pieces of the text data.

2. The document analysis system according to claim 1, wherein the analysis server further compares a first analysis result and a second analysis result with each other and determines the second analysis result as the at least one candidate storage location in a case where a result of the comparison is greater than or equal to a threshold, the first analysis result being obtained by using a first selected piece of the text data, the second analysis result being obtained by using combined text data including the first selected piece of the text data and a second selected piece of the text data sent from the image processing apparatus following the first selected piece of the text data.

3. The document analysis system according to claim 2, wherein the analysis server sends the image processing apparatus a request to additionally send one of the selected pieces of the text data, in a case where the result of the comparison is not greater than or equal to the threshold.

4. The document analysis system according to claim 3, wherein, upon each receipt of the send request, the image processing apparatus sends one of the selected pieces of text data which is selected from a different position on the extracted text data.

5. The document analysis system according to claim 1, wherein the analysis server determines the at least one candidate storage location as an analysis result by extracting a keyword from the text data and comparing the extracted keyword and a keyword corresponding to a storage location.

6. The document analysis system according to claim 1, wherein, in a case where a selected piece of the text data is less than a reference value, the image processing apparatus further sends the image data obtained by scanning the document to the analysis server, and the analysis server further performs analysis using the image data.

7. The document analysis system according to claim 6, wherein the analysis server determines the at least one candidate storage location as an analysis result based on a characteristic point of an image indicated by the image data.

8. An image processing apparatus comprising:
a processor; and
a memory configured to store a program, wherein the processor executes the program to perform:
   extracting text data from image data obtained by scanning a document;
   selecting pieces of text data from the extracted text data;

sequentially sending the selected pieces of the extracted text data to an analysis server until at least one candidate storage location for the image data is received from the analysis server, wherein the analysis server obtains the at least one candidate storage location by sequentially analyzing the sequentially sent pieces of the extracted text data and sends the obtained at least one candidate storage location to the image processing apparatus when the at least one candidate storage location is obtained before receiving all of the pieces of the text data, and wherein the sequentially sending process is stopped when receiving the at least one candidate storage location from the analysis server;

presenting the at least one candidate storage location, which is received from the analysis server;

prompting a user to select a storage location from the presented at least one candidate storage location; and sending the image data to the storage location selected by the user.

9. An analysis server comprising:

a processor; and a memory configured to store a program, wherein the processor executes the program to perform;

sequentially receiving selected pieces of text data from an image processing apparatus, wherein the image processing apparatus extracts the text data from image data, selects pieces of text data from the extracted text data and sequentially sends the selected pieces of the text data to the analysis server until at least one candidate storage location for the image data is received from the analysis server;

obtaining the at least one candidate storage location by sequentially analyzing the sequentially received selected pieces of the text data; and sending the obtained at least one candidate storage location for the image data to the image processing apparatus when the at least one candidate storage location is obtained before receiving all of the pieces of the text data, wherein, when the image processing apparatus receives the at least one candidate storage location from the analysis server, the image processing apparatus stops to sequentially send the selected pieces to the analysis server, presents the at least one candidate storage location sent from the analysis server, and prompts a user to select a storage location from the presented at least one candidate storage location.

* * * * *